Figure 1:
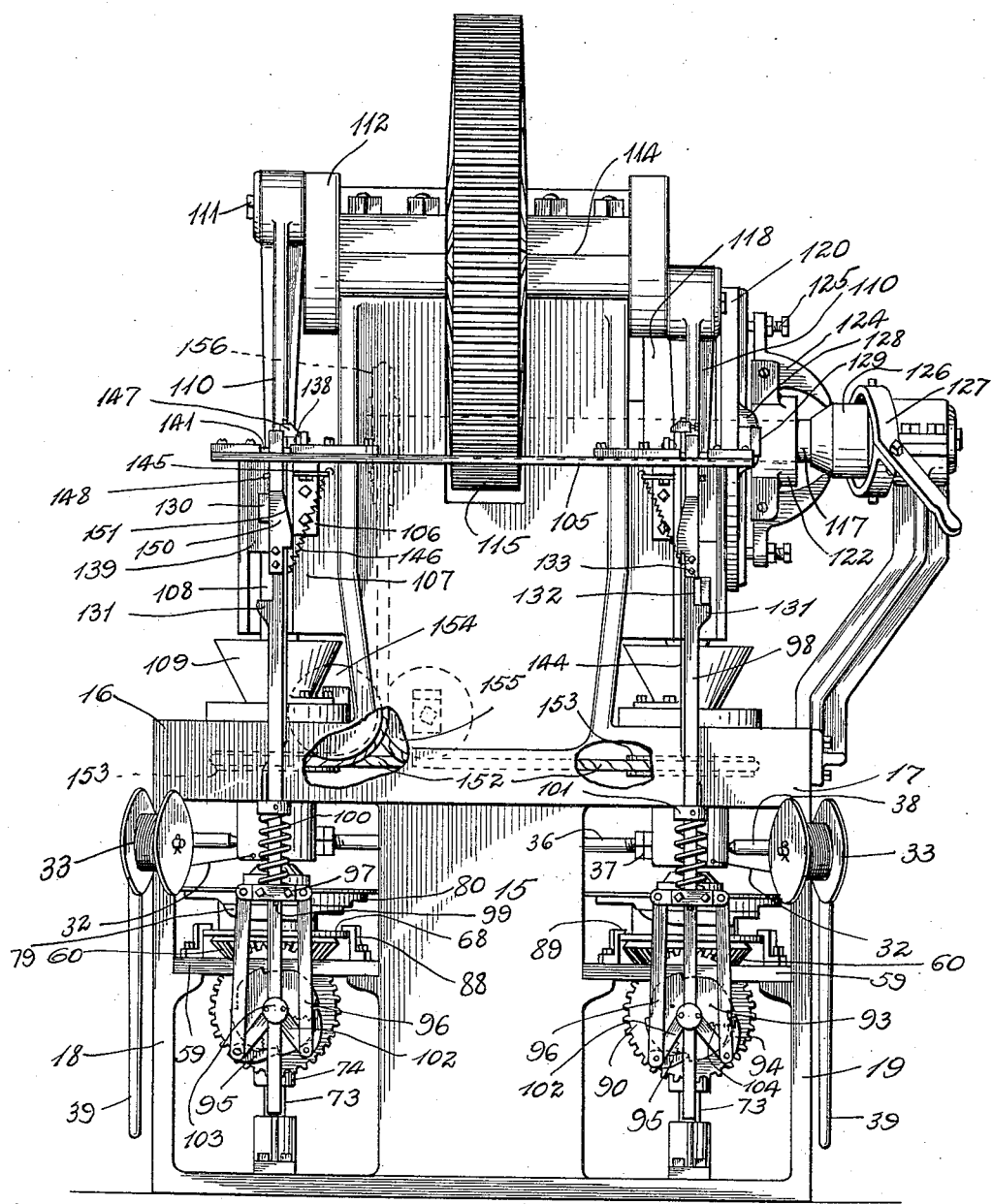

A. R. ENGLAND.
MATERIAL COMPRESSING MACHINE.
APPLICATION FILED APR. 1, 1912.

1,067,476.

Patented July 15, 1913.

7 SHEETS—SHEET 1.

Witnesses:

Inventor.
Andrew R. England,
by
Harold Strause
Attys.

A. R. ENGLAND.
MATERIAL COMPRESSING MACHINE.
APPLICATION FILED APR. 1, 1912.

1,067,476.

Patented July 15, 1913.

7 SHEETS—SHEET 3.

Witnesses:

Inventor.
Andrew R. England.
by
Attys.

A. R. ENGLAND.
MATERIAL COMPRESSING MACHINE.
APPLICATION FILED APR. 1, 1912.

1,067,476.

Patented July 15, 1913.

7 SHEETS—SHEET 4.

Witnesses.

Inventor.
Andrew R. England.
by
Attys.

A. R. ENGLAND.
MATERIAL COMPRESSING MACHINE.
APPLICATION FILED APR. 1, 1912.
1,067,476.
Patented July 15, 1913.
7 SHEETS—SHEET 5.
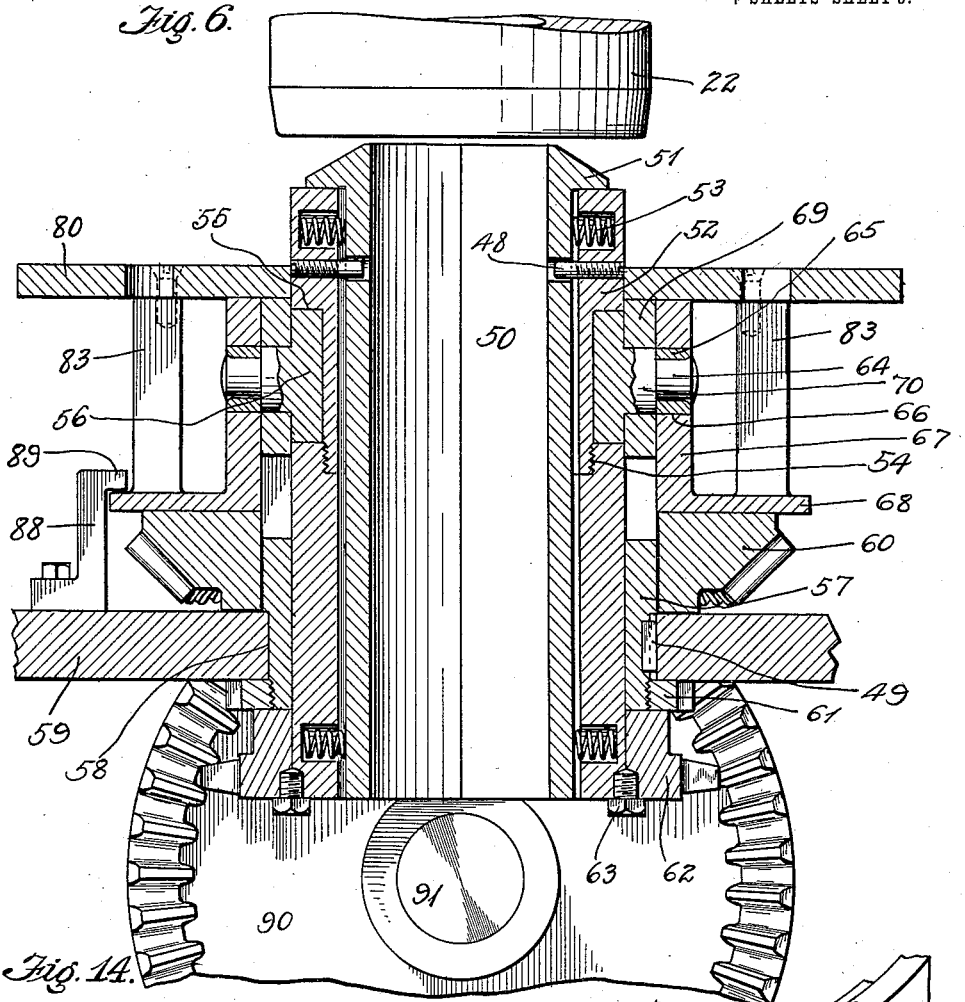
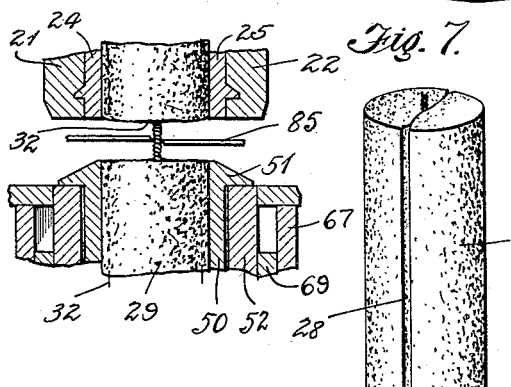
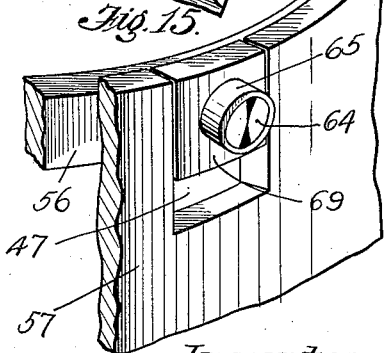
Inventor.
Andrew R. England.
by
Hazard Strause
Attys
Witnesses.

A. R. ENGLAND.
MATERIAL COMPRESSING MACHINE.
APPLICATION FILED APR. 1, 1912.
1,067,476.
Patented July 15, 1913.
7 SHEETS—SHEET 6.
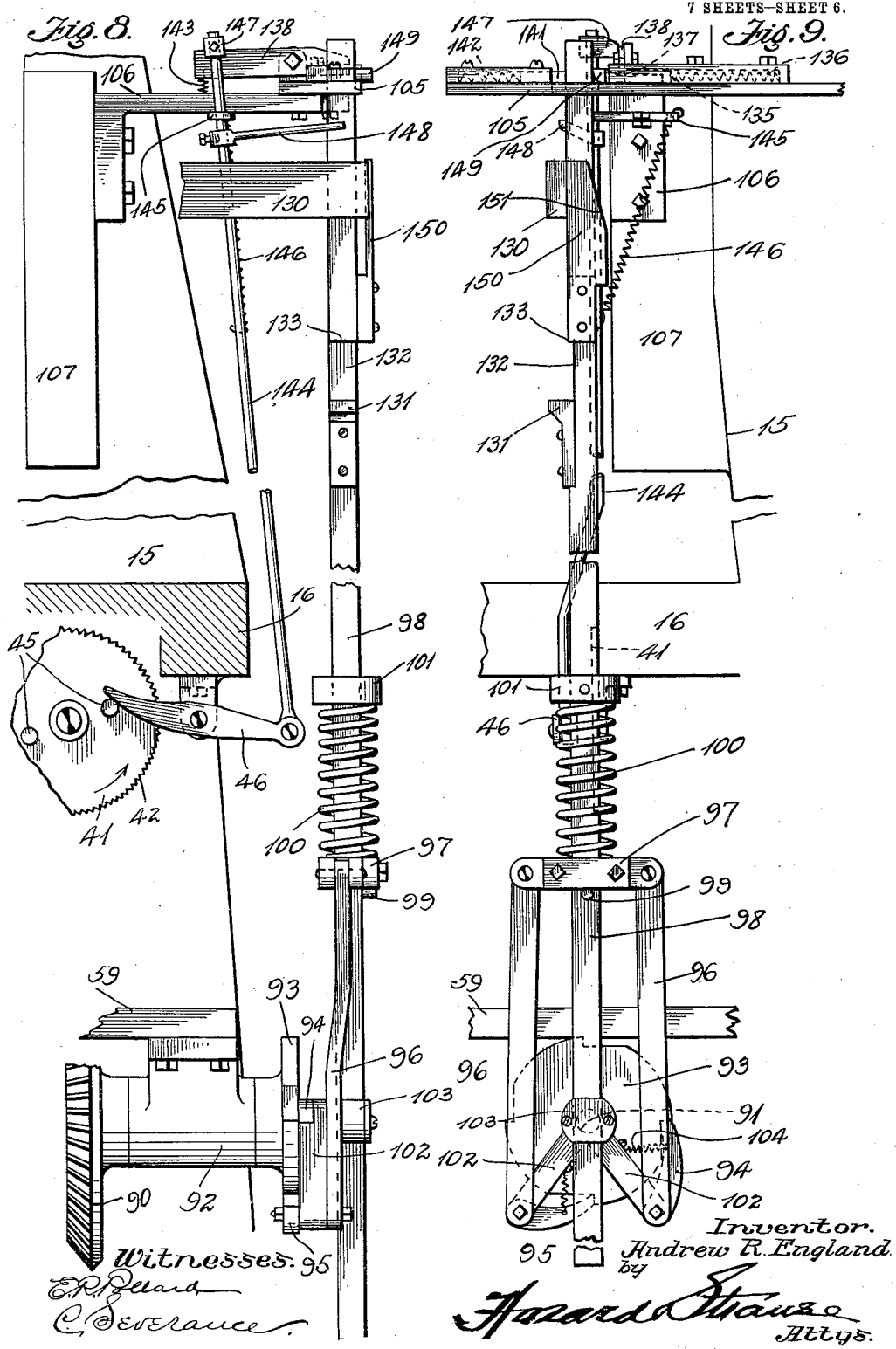
Witnesses
Inventor.
Andrew R. England
by
Attys.

A. R. ENGLAND.
MATERIAL COMPRESSING MACHINE.
APPLICATION FILED APR. 1, 1912.
1,067,476.
Patented July 15, 1913.
7 SHEETS—SHEET 7.
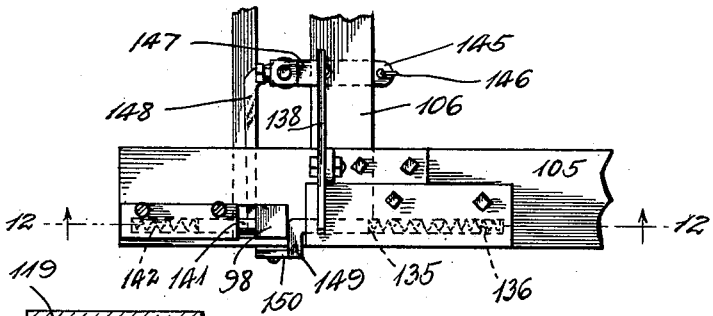
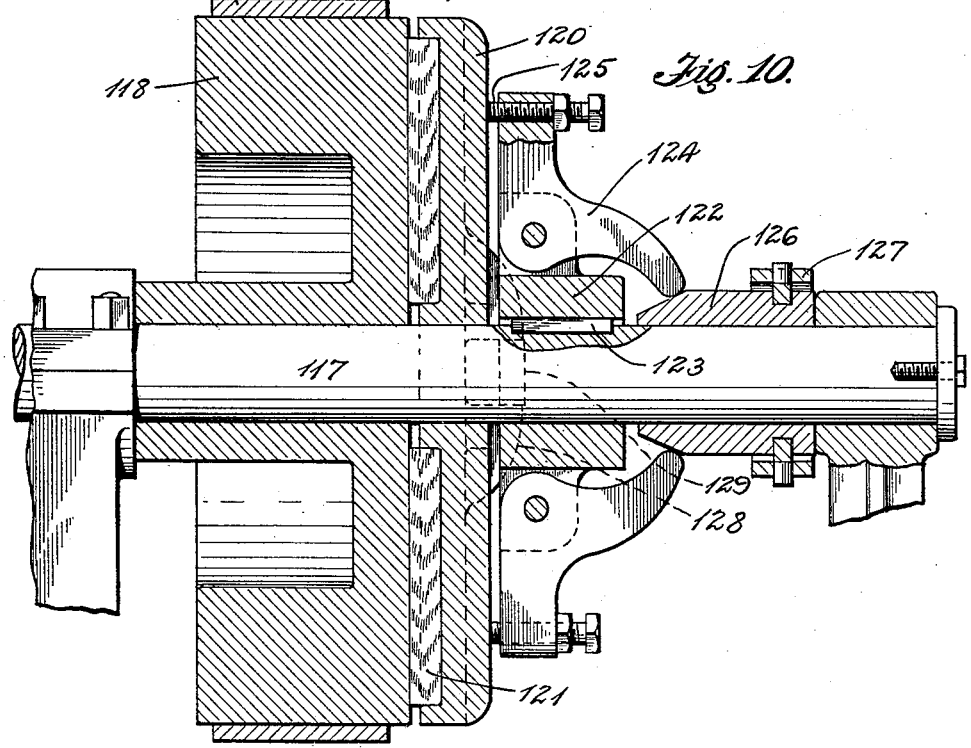
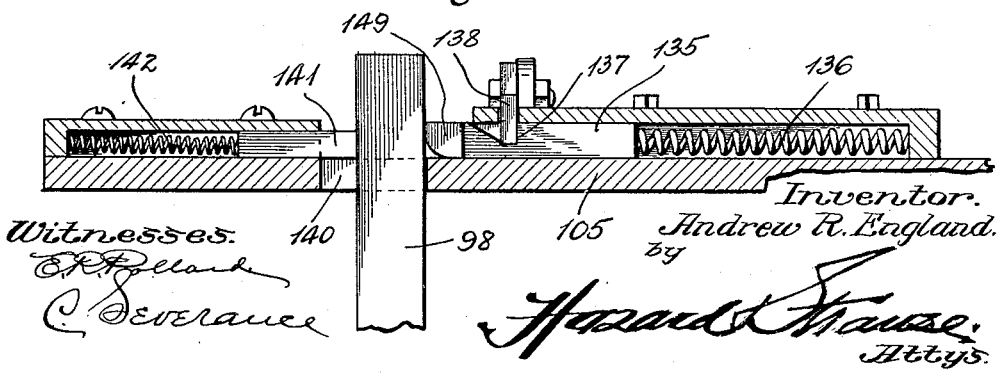
Witnesses:
Inventor.
Andrew R. England,
by
Howard Krause.
Attys.

UNITED STATES PATENT OFFICE.

ANDREW R. ENGLAND, OF LOS ANGELES, CALIFORNIA, ASSIGNOR, BY MESNE ASSIGNMENTS, TO CALIFORNIA FUEL MANUFACTURING COMPANY, OF LOS ANGELES, CALIFORNIA, A CORPORATION OF CALIFORNIA.

MATERIAL-COMPRESSING MACHINE.

1,067,476.                Specification of Letters Patent.     Patented July 15, 1913.
Application filed April 1, 1912. Serial No. 687,635.

*To all whom it may concern:*

Be it known that I, ANDREW R. ENGLAND, a citizen of the United States, residing at Los Angeles, in the county of Los Angeles and State of California, have invented new and useful Improvements in Material-Compressing Machines, of which the following is a specification.

This invention relates to improvements in compressing machines and particularly to machines which are adapted to hold loose materials and tightly and compactly press them together to form compact masses thereof.

It is an object of the invention to provide a machine in which loose material suitable for fuel may be brought together and compressed in the form of compact sticks, the material being bound so as to maintain its compressed form.

It is a further object of the invention to provide a machine in which chips, shavings, sawdust, or the like may be compressed into solid masses and binding wires may be placed about the same and twisted to hold said masses together.

It is a still further object of the invention to provide a machine in which material may be compressed into elongated sticks, wires being fed in knife grooves cut in sides of sticks and twisted together at the lower end of the stick of material in the machine, the said machine being provided with mechanism for breaking the sticks at intervals for separating it into suitable lengths and with further means for twisting the broken portion of the stick with the wires upon the sides thereof so as to tightly secure the wire at the upper end of the stick.

Figure 2:
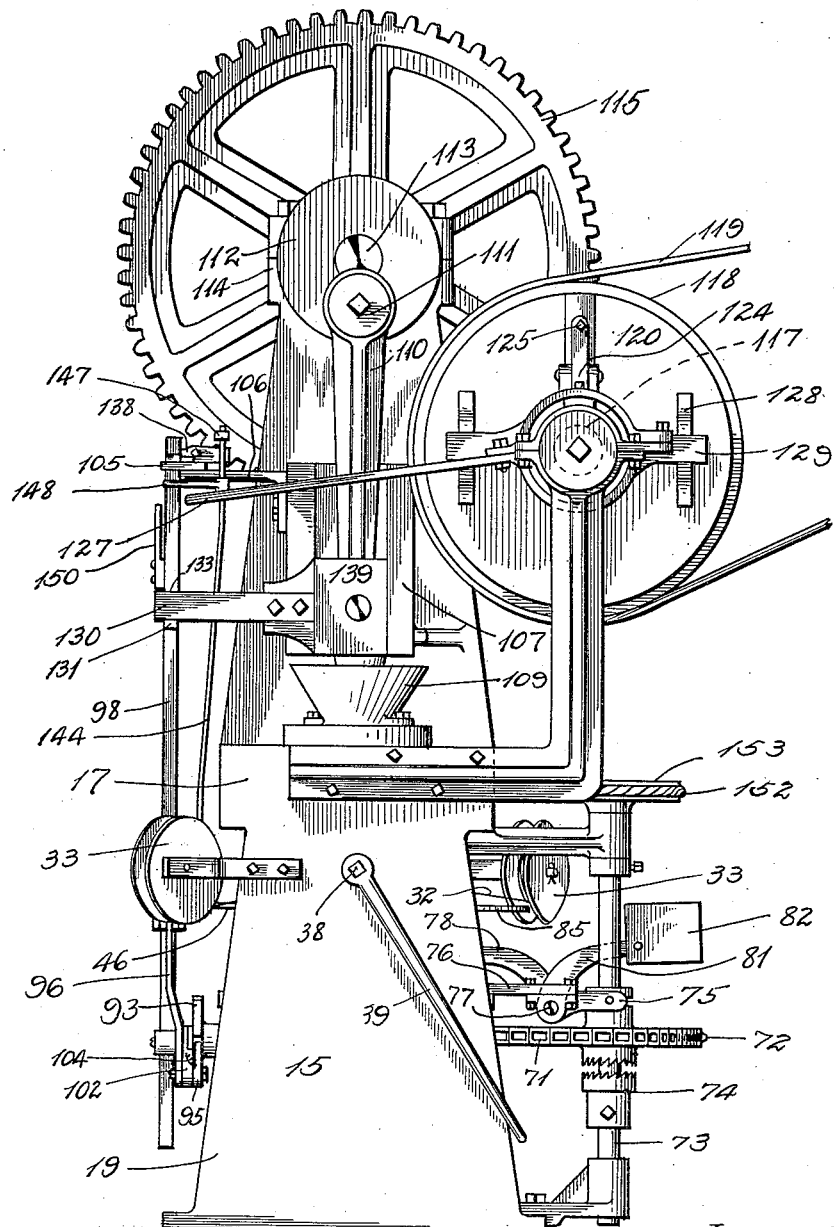
Figure 3:
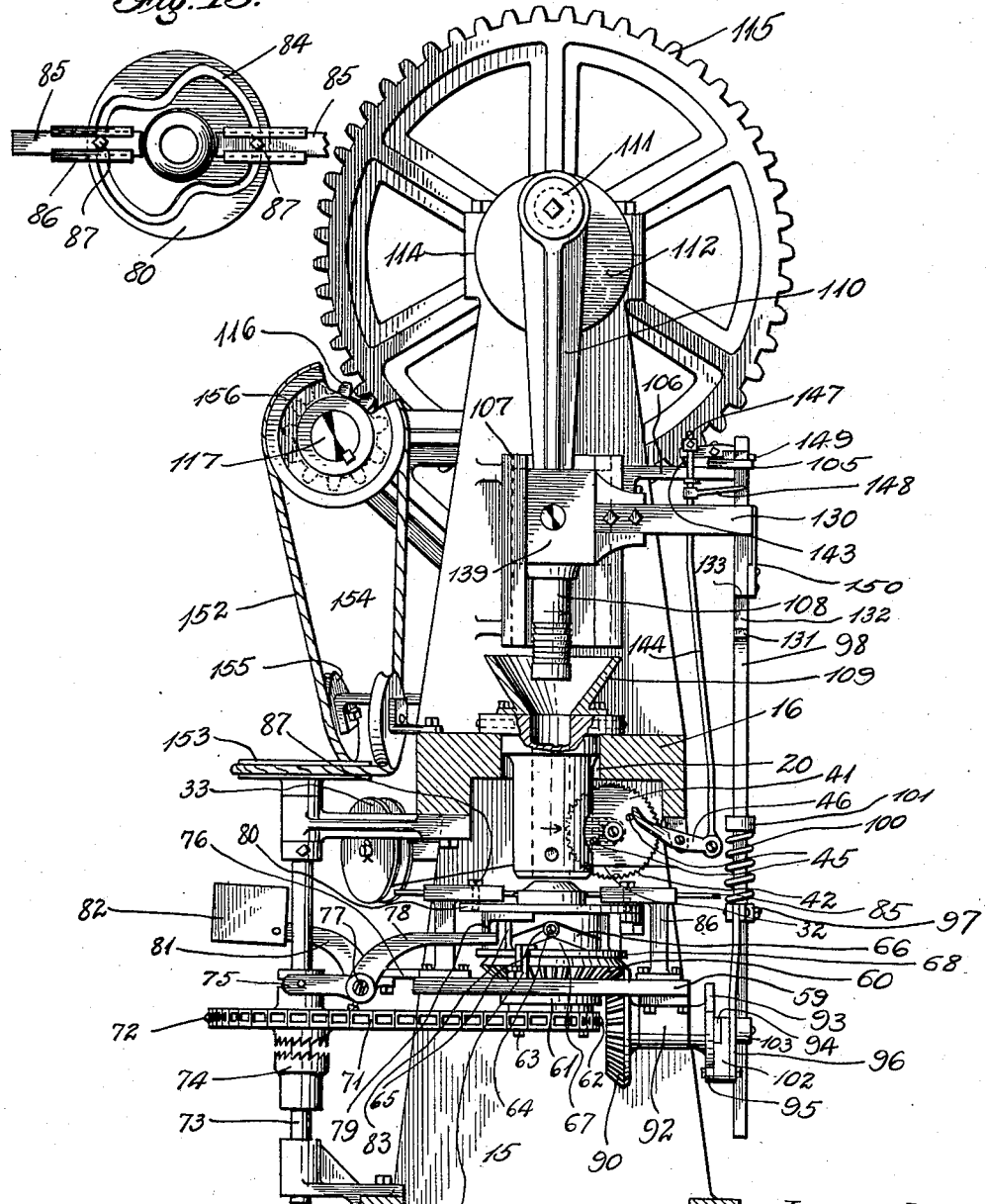
Figure 4:
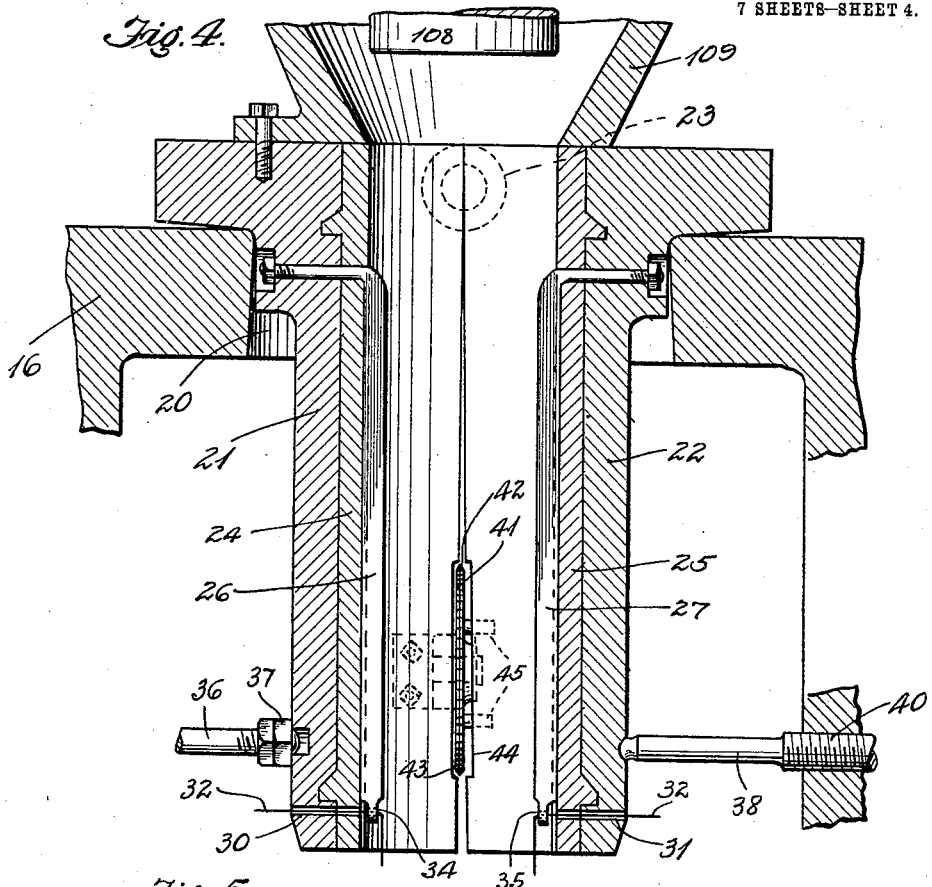
Figure 5:
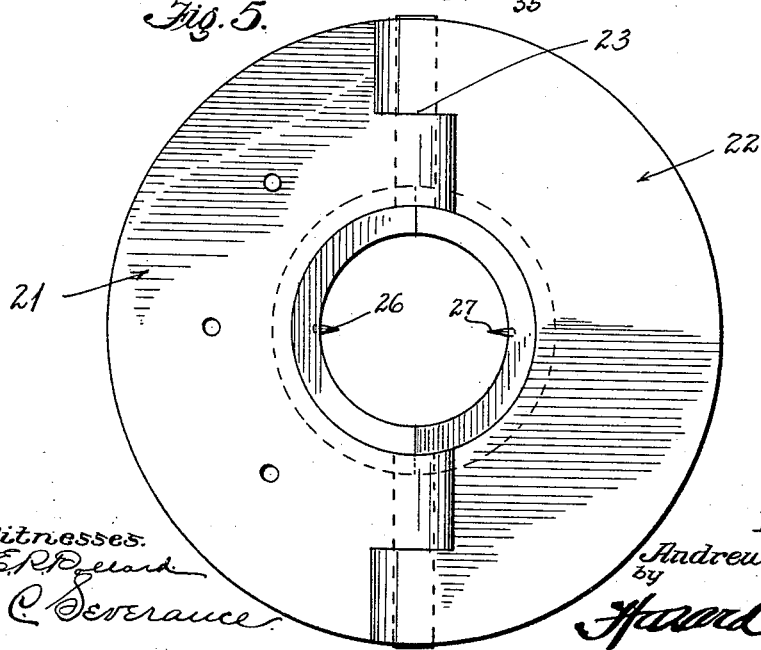

In the accompanying drawing forming a part of this specification, Figure 1 is a front elevation of a machine constructed in accordance with this invention. Fig. 2 is a side elevation of the said machine looking at one side thereof. Fig. 3 is a side elevation of the said machine looking at the opposite side from Fig. 2. Fig. 4 is an enlarged central sectional view through the forming die in which the material is compressed. Fig. 5 is a top plan view of the die portion of said mechanism. Fig. 6 is a central sectional view through the twisting mechanism upon the same scale as Figs. 4 and 5. Fig. 7 is a detail perspective view of one of the sticks of material formed and provided with a wire binder, in the machine. Fig. 8 is a side elevation upon an enlarged scale of the mechanism for controlling the intermittent movement of the stick breaking and wire twisting mechanism. Fig. 9 is a rear elevation of said mechanism. Fig. 10 is an enlarged sectional view through the actuating pulley of the machine and the clutch mechanism therefor. Fig. 11 is a top plan view of the upper part of the mechanism shown in Fig. 9. Fig. 12 is an enlarged detail sectional view taken upon the line 12—12 of Fig. 11. Fig. 13 is a detail view in plan of the knives for cutting the binding wire and the cam for operating the same. Fig. 14, is a detail sectional view through adjacent parts of one of the dies and twisting members, showing the knives ready to cut the central portion of the twisted wire. Fig. 15 is a fragmentary perspective view showing part of the ring used in reciprocating the twisting cylinder, and one of the slots for guiding said ring.

The details and features of the invention will now be more particularly described, reference being had to the said drawing in which—

15 indicates the main frame of the machine. The said frame is formed with a broad base and at a point approximately half of its height the said frame is provided with lateral extensions 16 and 17 forming a broad central platform portion for supporting the dies and coöperating mechanism.

While it will be understood that the machine may be provided with any number of forming dies and coöperating devices, yet two of such forming dies are found to operate advantageously upon a single machine and the drawings have been made to illustrate the machine as provided with a pair of the said forming mechanism and the invention will be described with respect thereto.

The outer ends of the platforms 16 and 17 are braced and supported by means of end standards 18 and 19. Each of said platform portions 16 and 17 is provided with an aperture 20 in which is mounted forming dies as hertofore intimated. Each of the said die forming mechanisms is preferably constructed like the device shown and described in my previous application for patent, S. N. 636,613, filed July 3, 1911, and is made up of a fixed die section 21 and a movable die section 22 hinged thereto at its upper end as indicated at 23. The die sections carry inner die liners 24 and 25 which together form a cylindrical passage within which the materials to be compressed are forced. The said sections are also provided with groove forming blades 26 and 27 as disclosed in said prior application which form lateral grooves or kerfs 28 in the sticks of composite material 29 illustrated in Fig. 7.

The lower ends of the dies are perforated at 30 and 31 to receive binding wires 32, which are drawn from spools 33 mounted upon the adjacent framing of the machine at a suitable distance from the said dies. The wires extend through said apertures 30 and 31 into and through eyes 34 and 35 formed in the lower ends of blades 26 and 27, so that the said wires are led into and properly laid in the kerfs or side grooves 28 of the compressed material, as the said material is forced through and out of the dies. The lower end of each fixed die section 24 rests against an adjustable abutment, usually made up of a rod 36 upon which adjustable abutment nuts 37 are mounted. The lower end of each movable die 22 is engaged by a rod 38 which is operable by a lever 39 for temporarily releasing the said movable die so as to prevent any sticking of the compressed materials within the die mechanism. Each rod 38 is formed with a screw threaded portion 40 engaging corresponding threads in the adjacent standard of the frame as clearly shown in Fig. 4 so that by turning it by means of the said handle 39 the rod 38 may be drawn outwardly a sufficient distance to ease up upon the compressed material within the dies.

Each fixed die section 21 has journaled thereon a wheel 41, the periphery of which is provided with sharp serrations 42. The adjacent meeting faces of the die sections 21 and 22 are provided with opposing recesses 43 and 44 in their adjacent edges to accommodate the said wheel 41 and permit its peripheral portion to extend into the space between the dies a sufficient distance to engage the compressed material forced therethrough. The said wheel will thus be caused to turn in correspondence with the downward movement of the said compressed material. One face of the wheel is provided with studs 45 which project from the wheel a sufficient distance to engage and operate a lever 46 which operates a feeding mechanism for the portion of the machine which separates the sticks after they have been forced downwardly a sufficient distance, which mechanism will be hereinafter fully described.

Below each die mechanism is mounted a mechanism for separating the sticks of material compressed in proper lengths and twisting the binding wire thereon. The said mechanism is made up of a stick receiving cylinder 50. Each cylinder is preferably formed in two sections having flanged upper ends, the flanges 51 thereof resting upon the upper edge of an outer inclosing cylindrical member 52. Springs 53 are interposed between the sections of the cylinders 50 and the cylindrical member for normally holding the cylinder sections together. Screw threaded pins 48 are carried by the cylindrical member 52 and engage apertures in the sections of the cylinder 50 to cause the parts to turn together and to prevent their separation longitudinally. The said outer cylindrical member 52 is formed in upper and lower cylindrical sections having a screw threaded engagement at their meeting ends as indicated at 54 for facilitating the assembling of the parts and for affording a cylindrical bearing around the periphery thereof at 55 to receive and movably engage a ring or sleeve 56, employed in raising or lowering the cylinders.

The outer cylindrical member 52 is movably mounted in a sleeve 57, which is keyed at 49 in an aperture 58 formed in a platform 59 mounted in the framing of the machine, said platform preferably resting on lugs formed upon the frame 15 and the end standards 18 and 19 as clearly shown in Fig. 1. A securing ring nut 61, being employed on the lower end of said sleeve to lock it in place. Journaled upon said sleeves 57 is a bevel gear 60, the hub of said gear 60 having a bearing upon the upper surface of the platform 59. The lower end of the cylindrical member 52 is provided with a sprocket wheel 62 which is rigidly connected with said member 52 by means of set screws 63 as clearly shown in Fig. 6. The turning of the sprocket 62 is thus capable of turning the cylindrical member 52. The said sprocket wheel also limits the upward movement of the cylindrical member 52 by bearing upon the under face of the locking ring 61 when the said cylindrical member 52 is in its elevated position. The upward movement of the said cylindrical member 52 is limited by the position of the ring 56 controlled by studs 64 which are mounted upon the said ring 56. The said studs 64 carry anti-friction rollers 65 which extend into and engage a cam path 66 formed in a cam cylinder 67. The said cam cylinder 67 is provided with a base flange 68 which rests upon and is rigidly secured to the bevel gear 60. The ring 56 is prevented from turning with the cylindrical member 52 by blocks 69 which slide in slots 47, let into the upper edge of the sleeve 57 as shown in Figs. 6 and 15, the enlarged base portions 70 of the studs 64 passing through said blocks 69. The structure of the parts just described is such that by rotating each bevel gear 60 each cam cylinder 67 will be turned so as to raise or depress the studs 64 and each cylindrical member 52. The said cam path 66 is preferably made with quadrantal inclined portions as shown in Fig. 3, each inclined part occupying about one-quarter of the periphery of the cam cylinder 67, so that in turning the cam cylinder from time to time its cylindrical member 52 and the material carrying cylinder 50, will be raised or depressed in due course for receiving and breaking off a portion of the stick of material compressed and also holding the same so that the said material may be turned to twist the wires around the ends thereof.

Each cylindrical member 52 is also adapted to be turned by means of its sprocket wheel 62, which is connected by a sprocket chain 71 with a driving sprocket wheel 72, mounted upon a vertical shaft 73 arranged to one side of the framing. Bearings projecting from the said framing revolubly support each shaft 73 in vertical position and a clutch member 74 is mounted upon each shaft 73 and adapted to be turned thereby when the shaft is rotated. The sprocket wheel 72 is loosely mounted on its shaft and is provided with a clutch hub portion adapted to engage the clutch member 74 when the sprocket wheel 72 is lowered. Each sprocket wheel is adapted to be raised or lowered by means of a lever 75 which is mounted upon a bracket 76 projecting from the platform 59. The lever 75 is secured to a rock shaft 77 mounted upon said bracket 76 so that when it is rocked the lever 75 will be caused to lower or raise the sprocket wheel 72 whereby the clutch member 74 will be capable of rotating the said sprocket wheel. An arm 78 is also secured to each shaft 77 and its free end extends toward the cam cylinder 67 and engages cams 79 secured to a cam plate 80 which is mounted upon each cam cylinder 67. The said cam cylinder 67 is turned two quarter movements or half way around between each alternate forcing of material into the dies, for forming the stick of fuel and it is desirable therefore to rotate the member 52 for twisting the wires during each half revolution of said cam cylinder 67. For this reason two cams 79 are employed for depressing each arm 78 and raising the sprocket wheels 72 out of engagement with their clutches 74 while the cylinder 52 is not being moved. At intermediate points each arm 78 will be released and permit the turning of the cylindrical member 52 by means of the sprocket chain 71 for twisting the wires. In order to insure the proper dropping of the sprocket wheels 72, an arm 81 is secured to each shaft 77 and projects outwardly therefrom carrying a weight 82 which normally tends to rock the shaft 77 so as to lower the sprocket 72.

Each cam plate 80 is preferably a horizontal circular plate having a central aperture adapted to fit over the cylindrical member 52 and resting upon the upper edge of the sleeve 57. The plate 80 is further supported by means of standards 83 which rise from the flange 68 of the said cam cylinder 67 and engage the under surface of the said cam plate 80. Securing screws are preferably employed for properly fastening the said plate 80 to the said standards. Each cam plate 80 is provided with a cam path 84 which is adapted to cause the reciprocation of oppositely arranged reciprocating knife blades 85. The said knife blades are mounted in horizontal bearings formed upon the upper end of standards 86 which are bolted at their lower ends to the platform 59. The bearing portions at the upper ends of said standards 86 project inwardly to a considerable extent over the said cam plate 80 so that bolts 87 secured to the knife blades 85 and allowed to project below the same will engage the cam path 84. The cam path is so shaped that when the cylindrical member 52 is lowered the knives 85 will be simultaneously forced inwardly toward each other so as to engage the twisted wires about centrally of the twisted portion thereof as shown in Fig. 14 and cut them so as to separate the bound portion of the stick of material from the wires still remaining in the machine.

To prevent the cam plate 67 and the gear 60 engaging it from rising out of contact with the platform 59, brackets 88 may be secured to said platform, and provided with overhanging end portions 89 which engage the flange 68 of the cam cylinder 67, permitting its rotation but preventing its being lifted from place. Each gear 60 meshes with an actuating gear 90 which is carried by a horizontal shaft 91 mounted in a bearing 92 upon the under side of the said platform 59. Each shaft 90 is actuated from time to time by means of a ratchet disk 93 which is secured to the outer end of the shaft 91. The said ratchet disk 93 is preferably formed with four ratchet teeth by making a corresponding number of notches in the edge of said disk 93 as clearly shown in Figs. 1 and 9 of the drawing.

Each ratchet disk 93 is adapted to be turned with a step by step movement by means of spring actuated dogs 94 and 95 which are pivotally connected with links 96 extending to a cross head 97 movably mounted upon a reciprocating rod 98. This said cross head is limited against downward movement by means of a pin 99 carried by the said rod 98. A spring 100 is interposed between the upper edge of said cross head and a collar 101 fastened on said rod 98.

The cross head 97 may yield upwardly when anything prevents the turning of the disk 93, as for instance the getting of a block or chip between the die mechanism and the twisting cylinder so that the said twisting cylinder cannot be turned temporarily. A breaking of the parts is thus guarded against. The movement of the lower ends of the links 96 is guided by means of shorter links 102 which are pivoted to the lower ends of said links 96 and are also pivoted at their upper end to the reduced end of the shaft 91 of the said disk 93. The outer end of said shaft also carries a bearing 103 through which the lower end of the rod 98 passes. The dogs 94 and 95 are connected with the links 102 by springs 104 which normally hold the outer ends of said dogs in contact with the periphery of the disk 93. The rod 98 normally rests in the position shown in Fig. 9 so that the dog 94 is in engagement with a ratchet tooth at one side of the disk 93. An elevation of the rod 98 will cause the said dog 94 to rotate the disk 93 one quarter of a turn and the dog 95 will then come in contact with the next notch and upon the lowering of the rod 98 again will engage the proper notch to turn the disk an additional quarter turn. This through the agency of the gears 90 and 60 will impart two quarter turns to the twisting mechanism so as to depress the same and raise it again.

The upper end of each rod 98 extends upwardly to a point opposite the plunger mechanism which is employed in forcing the materials into the die and engages a bearing formed in a guide plate 105 which is supported upon a bracket 106 fastened to the frame of the machine. The operation of each rod 98 is effected by the action of the plunger heads employed in the machine and each side of the machine is provided with such a plunger head 139 adapted to move in guides 107 secured to the main frame. Each plunger head is provided with a plunger 108 of a proper size to fit into the die mechanism, said plunger being preferably formed as shown in Fig. 3 of the drawing. A guide hopper 109 is employed in connection with each plunger and secured upon the die sections so as to guide the material to be compressed into the die sections. The plunger head 139 at each end of the machine is pivotally connected with a pitman 110 which extends upwardly and engages a wrist pin 111 secured to a crank disk 112. A shaft 113 mounted in bearings 114 upon the top of the machine frame carries the said crank disks 112. An actuating gear 115 is centrally secured to said shaft for rotating it. The wrist pin 111 at one end of the machine is preferably diametrically opposite to the wrist pin at the other end of the machine so that one plunger will be descending while the other is rising.

Any suitable driving mechanism or gear may be arranged to mesh with the gear 115 for operating the machine. The gear 115 is shown in the drawing as meshing with a pinion 116 which is keyed to a shaft 117 mounted upon suitable brackets formed upon the frame 15. The shaft 117 is provided with a driving pulley 118 arranged near one end thereof and loosely journaled thereon. The pulley may be connected by belting 119 with any suitable source of power for driving the machine. Mounted upon the said shaft 117 is a clutch member whereby the operation of the machine may be started or stopped under the control of the attendant, said clutch member preferably consisting of a disk 120 mounted upon the shaft 117 and having friction blocks 121 upon its inner face, the said friction blocks being adapted to be forced against the adjacent side face of the pulley 118 in order to hold it rigid with respect to the said shaft 117 so that movement will be imparted therefrom to said shaft. Also mounted upon the said shaft 117 is a hub 122 fastened thereto by a key 123 and the said hub is provided with outwardly extending bifurcated projections within which are pivotally mounted levers 124. The outer ends of said levers 124 are provided with adjustable bearing screws 125 adapted to engage the adjacent surface of the disk 120 so that when the other ends of the said levers are forced outwardly the bearing screws will force the disk 120 against the pulley 118. The inner ends of the said levers 124 are engaged by a sleeve 126, having a beveled end portion adapted to engage and spread them. A hand operated lever 127 is also mounted upon the frame of the machine and pivotally connected with the said sleeve 126 for moving it longitudinally upon the shaft 117 in operating the clutch. In order to prevent the disk 120 from rotating with respect to the shaft 117 the said disk 120 is provided with oppositely arranged pairs of lugs 128, between which project laterally extending arms 129 carried by the said hub 122. The disk 120 is thus movable longitudinally of the shaft 117 but must turn with the said shaft.

Each of the plunger heads 139 is provided with a laterally projecting arm 130 which projects to one side of the rod 98 upon that side of the machine. The said arm 130 in descending is adapted to engage an abutment bracket 131, secured to the side of the rod 98 so as to carry the said rod downwardly. The rod is notched at 132 forming a shoulder 133, which is adapted to engage the upper edge of said arm 130 for lifting the rod 98. The said rod is normally held a little to one side of the arm 130 so that the plunger may reciprocate a number of times in compressing different charges of material in the dies without reciprocating the said rod 98.

When the rod 98 is to be reciprocated for causing the turning of the twisting cylinders the said rod is moved to one side a sufficient distance to permit the notch 132 to receive the arm 130 and so that the shoulder 133 will engage said arm. In order to control the position of the upper end of each rod 98, spring pressed plungers engage the same. One of said plungers, namely 135 is mounted in a suitable housing upon the plate 105 and is provided with a rounded nose portion adapted to bear against one side of the rod 98. The said plunger 135 is normally pressed against the rod 98 by a spring 136. The plunger 135 is provided with a notch 137 adapted to be engaged by the end of a pivoted latch 138. The said latch is pivoted upon a lug on the plate 105 so as to be normally held in the position shown in Fig. 12. The bearing in the plate 105 through which the rod 98 passes is an elongated bearing as shown at 140 permitting of the rod 98 being moved laterally therein. Opposite to the plunger 135 is a similar plunger 141 also mounted in a housing on the said plate 105 and a spring 142 normally holds the said plunger against the said rod 98. The spring 136 is however preferably stronger than the spring 142, so that when the plunger 135 is released by the movement of the latch 138 out of the notch 137, the plunger 135 will force the rod 98 over in the bearing 140 against the action of the said spring 142, and in this way brings the shoulder 133 into engagement with the arm 130 of the plunger head. The latch 138 normally tends to engage the said notch 137 under the action of a spring 143 interposed between the opposite end of the latch from the notch engaging portion, and the bracket 106 which supports the mechanism. When the plunger 135 is moved against the action of the spring 136 the said latch will thus tend to fall into the notch 137 and lock the plunger in its retracted position. In order to release the plunger again when it is desired to have the rod 98 reciprocated, a pitman rod 144 is provided and connected at its lower end with the lever 46, while its upper end passes through an elongated guide bearing formed in a plate 145 secured to the bracket 106. The said pitman rod 144 is normally drawn upwardly by means of a spring 146 which is connected with the opposite end of the plate 145 from that through which the said pitman rod 144 passes. The said spring will thus also tend to pull the pitman rod 144 toward the opposite end of the plate 145 from the bearing through which it passes. The upper end of the said pitman rod 144 is provided with a laterally projecting detent 147 which normally overhangs the spring actuated end of the latch 138. When the latch is disconnected by the pulling downwardly of the pitman rod 144 under the action of the lever 46, it will release the plunger 135 and permit the spring 136 to force the rod 98 over in its bearing 140. At the same time the pitman rod 144 will also be forced over by means of an arm 148 rigidly clamped on said pitman rod and extending across one edge of the rod 98 so that the latch 138 will be released again and ready to engage the notch 137 when the plunger 135 is retracted. The said plunger 135 is provided with a laterally extending projection 149 which extends into the path of a plate 150 secured to one side of the rod 98. The upper end of said plate 150 is spaced from the said rod 98 a sufficient distance to pass the edge of the plate 105 and the said upper portion of said plate 150 is beveled or inclined at 151 in such a manner as to force the projection 149 to one side as the said plate engages the same. In this manner the plunger 135 is reset and latched in its retracted position as the rod 98 is elevated.

The shafts 73 at each side of the machine are operable by a single cable 152, the said cable engaging grooves formed in pulleys 153 secured to the upper ends of said shafts 73. The cable passing around said pulleys 153 also passes about guiding pulleys 154 and 155 and thence to a grooved pulley 156 which is secured to the shafting 117. In this manner the shafts 73 are continuously rotated when the machine is being driven by the shaft 117 and whenever the sprocket wheels 72 are depressed they will engage the rotating clutch members 74 and receive motion therefrom.

The operation of the machine will be readily understood from the above description and need be only generally referred to at this point. The machine is provided with loose material such as shavings, chips of wood and the like which are fed into the hoppers 109 upon each side of the machine. The clutch mechanism is operated for imparting movement to the shaft 117 so that the plungers 108 are reciprocated. The said plungers continually force the loose material into the dies beneath them forming a continuous compressed stick, the stick being lengthened as charges of material are continuously compressed beneath the plungers. When a sufficient portion of the compressed stick has been forced past the wheel 41 to pull upon the pitman rod 144, the arms of the plungers will be caused to reciprocate the rods 98 thus feeding the disks 93 for two-quarters of a revolution of the cylindrical member 52 to first depress and then raise the twisting member. While the twisting member is being depressed and raised, the clutches 74 will operate the sprocket wheels 72 so as to twist the wires where the stick is broken by the depression of the cylindrical member 52. At the same time the knives will be brought together for severing the twisted wires at a point intermediate of their twisted length, leaving a slight projecting twisted portion at each end of the stick as shown in Fig. 7. As soon as the wires have been severed the completed stick will be forced downwardly by the incoming stick above and will drop out at the bottom of the cylindrical member 52.

What I claim is:

1. A compressing mechanism, comprising a machine having a die, means for forcing loose material into said die, and means for automatically breaking off a portion of the compressed material and forming it into separate sticks.

2. A compressing mechanism, comprising a die adapted to have loose material pressed into the same to form a continuous stick of composite material, a member for receiving a portion of said stick from the dies and breaking off and twisting the same to secure a binder about the stick.

3. A compressing machine for forming composite sticks, comprising a frame, a plurality of dies mounted thereon adapted to receive the materials to be compressed, alternately reciprocating plungers adapted to force the material into said dies, axially disposed members to receive said compressed material, and automatic means to separate the members and dies to break the composite sticks.

4. A compressing machine, comprising a frame, a plurality of material receiving dies mounted therein, reciprocating plungers adapted to force material into said dies, and twisting members adapted to receive the material from the dies and to twist wires surrounding the same.

5. A material compressing machine having dies formed with yielding sections, reciprocating plungers for forcing material into said dies, means for releasing the yielding sections in the event of the material becoming too tightly wedged therein, and means for receiving and breaking off the material in suitable stick lengths.

6. A material compressing machine having expansible dies mounted therein, means for forcing the material into said dies to assemble it into the form of a composite stick, means for producing grooves in the periphery of said stick, means for laying the wires into said grooves, a member for receiving a portion of the stick and breaking it off, said member being also adapted to twist the stick for twisting the wire at the end thereof.

7. A material compressing machine having a plurality of dies mounted thereon, means for compressing material in said dies to form a stick, means for receiving the end of the stick, means for breaking off and twisting a portion of the stick means to secure binding wires about the same, and means for cutting said wires.

8. A material compressing machine having a die mounted therein, a reciprocating plunger for forcing material into the dies, means for placing wires about the material, a material receiving cylinder, means for depressing and then raising the cylinder for breaking off a portion of the compressed material, and means for rotating the said member while it is being depressed and raised, for twisting the wires at the ends of the said material.

9. A material compressing machine having material receiving dies, means for forcing material into said dies to produce an elongated stick of composite material, a movable member adapted to receive a portion of the stick, means to place wires around the said stick, a cam for depressing the said member and raising the same, means for turning the said member to turn the material and twist the wire about the same, and a stick controlled member adapted to start the operation of the twisting member when a predetermined quantity of composite material has been fed past the same.

10. A material compressing machine having material receiving and forming dies, plungers for forcing material into said dies, a movable member adapted to receive a portion of the compressed material, means movably mounted on said movable member capable of raising and lowering it, a cam plate adapted to operate said means, and means for rotating the said movable member, for rotating the stick to twist the binding wire, placed about it.

11. A material compressing machine having a plurality of material receiving dies mounted thereon, means for forcing material into said dies to produce composite sticks, twisting members adapted to receive the said sticks having yielding material engaging sections, means for guiding the said movable member in its vertical movement and in its rotating movement, a cam for accomplishing the depression and raising of the said movable member, a sprocket connected with the said member for turning it, a sprocket chain engaging said sprocket, and means for driving the said sprocket chain when the said movable member is being reciprocated, for rotating the material and securing a binder thereon.

12. A material compressing machine comprising material forming devices, twisting members for receiving the shaped material, and a ratchet mechanism for operating said twisting mechanism.

13. A material forming machine having forming dies, reciprocating plungers for forcing the material into the same, members for receiving the material compressed, gearing for causing the turning and depressing of the said receiving members, ratchets for imparting a step by step movement to the gearing, and mechanism controlled by the movement of the reciprocating means for operating said ratchets.

14. A material compressing machine having a forming die, a reciprocating plunger for forcing material into said die, a twisting member adapted to receive material after it is compressed, means for placing wires about said material, gearing for accomplishing the vertical reciprocating of said twisting member, means operated by the reciprocating plunger for moving said gearing periodically, a sprocket mechanism for rotating said twisting member to twist the wire about the material, a clutch mechanism for actuating said sprocket mechanism, and means for separating and bringing together the parts of the clutch mechanism periodically, to accomplish the twisting of the wires after the formation of each stick of material.

15. A material compressing and stick forming device comprising a machine having a die, a reciprocating plunger for forcing material into the die, a twisting member adapted to receive the material from the die, a cam mechanism adapted to raise and depress the twisting member for breaking off a portion of the stick, means for placing wires about the material, means for rotating the twisting member to twist the wires, reciprocating knives mounted adjacent to the twisting member, a cam plate for operating said knives, and means for operating both of said cam plates simultaneously.

16. A material compressing machine having dies mounted therein, reciprocating members for forcing material into said dies, twisting members for receiving the material from the dies, means for placing a wire about the material, means for operating the twisting member intermittently for raising and lowering it, ratchet mechanisms for operating said means, reciprocating bars connected with said ratchet mechanisms, arms carried by said reciprocating members, the reciprocating rods being provided with shoulders for engaging said arms, spring actuated means for moving the rods to one side for engaging said arms whereby the rods will be reciprocated, a spring actuated latch controlling said spring actuated means, spring actuated pitmen adapted to operate said latching means, and a material controlled member for actuating said pitmen.

In witness that I claim the foregoing I have hereunto subscribed my name this 18th day of March, 1912.

ANDREW R. ENGLAND.

Witnesses:
E. STADLMAN,
EARLE R. POLLARD.

---

Copies of this patent may be obtained for five cents each, by addressing the "Commissioner of Patents. Washington, D. C."